(12) United States Patent
Subbarao

(10) Patent No.: US 7,577,309 B2
(45) Date of Patent: Aug. 18, 2009

(54) DIRECT VISION SENSOR FOR 3D COMPUTER VISION, DIGITAL IMAGING, AND DIGITAL VIDEO

(76) Inventor: Muralidhara Subbarao, 95 Manchester La., Stony Brook, NY (US) 11790

(*) Notice: Subject to any disclaimer, the term of this patent is extended or adjusted under 35 U.S.C. 154(b) by 682 days.

(21) Appl. No.: 11/450,024

(22) Filed: Jun. 10, 2006

(65) Prior Publication Data

US 2006/0285741 A1     Dec. 21, 2006

Related U.S. Application Data

(60) Provisional application No. 60/691,358, filed on Jun. 18, 2005.

(51) Int. Cl.
*G06K 9/40* (2006.01)
(52) U.S. Cl. .................. 382/260; 382/274; 382/275; 358/3.26; 358/3.27
(58) Field of Classification Search ............ 382/260, 382/274, 275; 358/3.26, 3.27, 463
See application file for complete search history.

(56) References Cited

U.S. PATENT DOCUMENTS

| | | | |
|---|---|---|---|
| 5,148,209 A | | 9/1992 | Subbarao |
| 6,271,940 B1 * | | 8/2001 | Deschuytere et al. ....... 358/504 |
| 6,452,686 B1 * | | 9/2002 | Svetkoff et al. ............. 356/602 |
| 6,750,974 B2 * | | 6/2004 | Svetkoff et al. ............. 356/602 |
| 6,819,790 B2 * | | 11/2004 | Suzuki et al. ................ 382/156 |
| 7,112,762 B2 * | | 9/2006 | Finley et al. ................ 219/201 |

OTHER PUBLICATIONS

U.S. Appl. No. 11/235,724, filed May 11, 2006, Muralidhara Subbarao.
U.S. Appl. No. 11/242,191, filed May 25, 2006, Muralidhara Subbarao.
P. Favaro and S. Soatto, in "A geometric approach to shape from defocus" (http://www.vision.cs.ucla.edu/papers/favaroSoatto05PAMI.pdf), IEEE Transactions on Patt. Anal. and Mach. Intell., vol. 27, No. 3, Mar. 2005, pp. 406-417.
S. Chaudhuri and A. Rajagopalan, "Depth from defocus: a real aperture imaging approach", Springer Verlag, 1999, ISBN 0387986359.

* cited by examiner

*Primary Examiner*—Yosef Kassa

(57) ABSTRACT

A method and apparatus for directly sensing both the focused image and the three-dimensional shape of a scene are disclosed. This invention is based on a novel mathematical transform named Rao Transform (RT) and its inverse (IRT). RT and IRT are used for accurately modeling the forward and reverse image formation process in a camera as a linear shift-variant integral operation. Multiple images recorded by a camera with different camera parameter settings are processed to obtain 3D scene information. This 3D scene information is used in computer vision applications and as input to a virtual digital camera which computes a digital still image. This same 3D information for a time-varying scene can be used by a virtual video camera to compute and produce digital video data.

20 Claims, 13 Drawing Sheets

Steps in determining the Shift-variant Point Spread Function h'

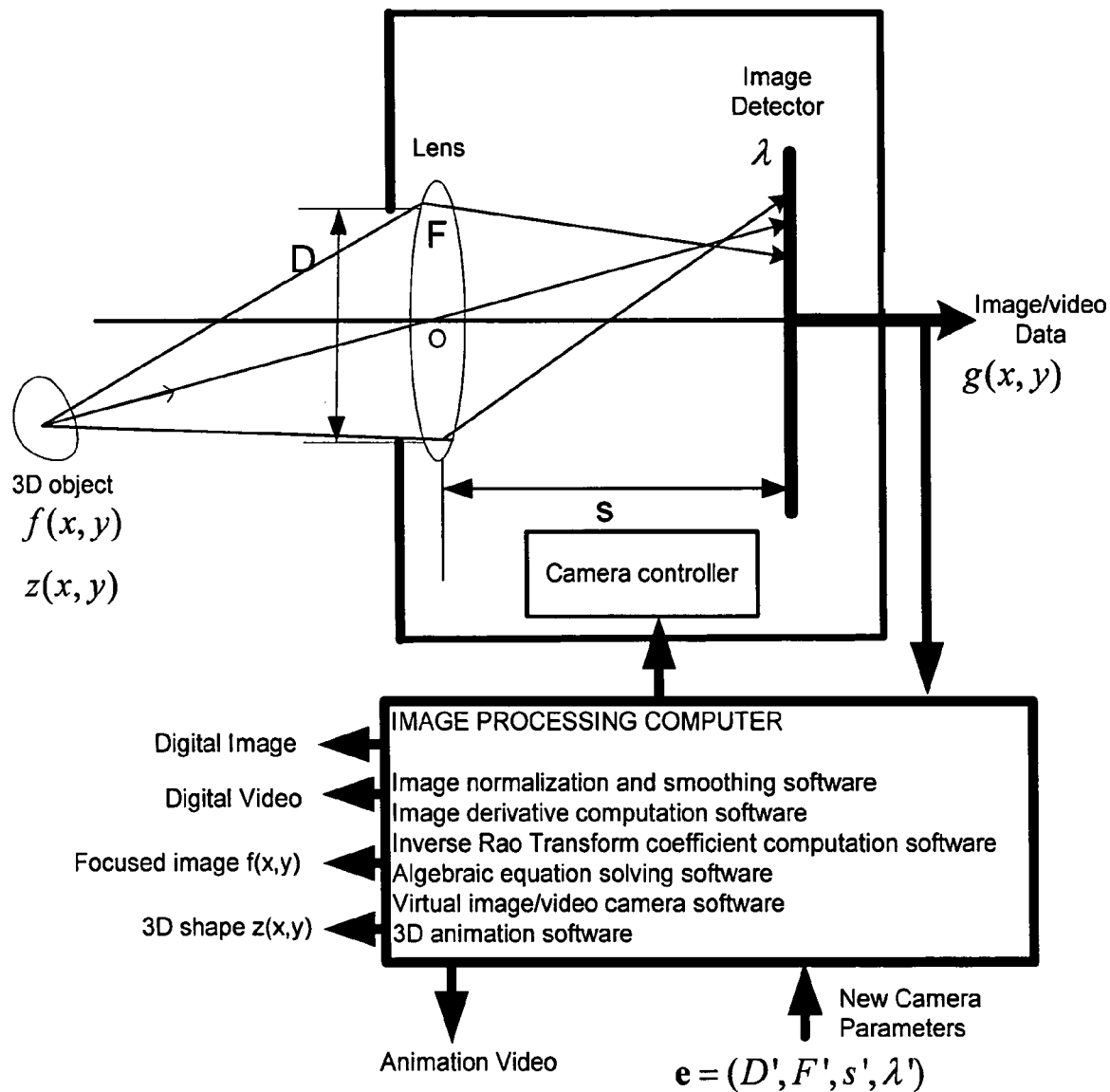

f(x,y) : Focused image (input from scene to camera)
z(x,y): 3D shape of object surface (input from scene to camera)
g(x,y): blurred image recorded by camera (output from camera)
D: Camera aperture diameter
F: Focal length of lens or optical system
S: lens to image detector distance
lambda: wave length of color channel of image
camera controller: sets D,F,S, lambda.

Figure 1. Direct Vision Sensor: Camera structure, camera Parameters, and software components

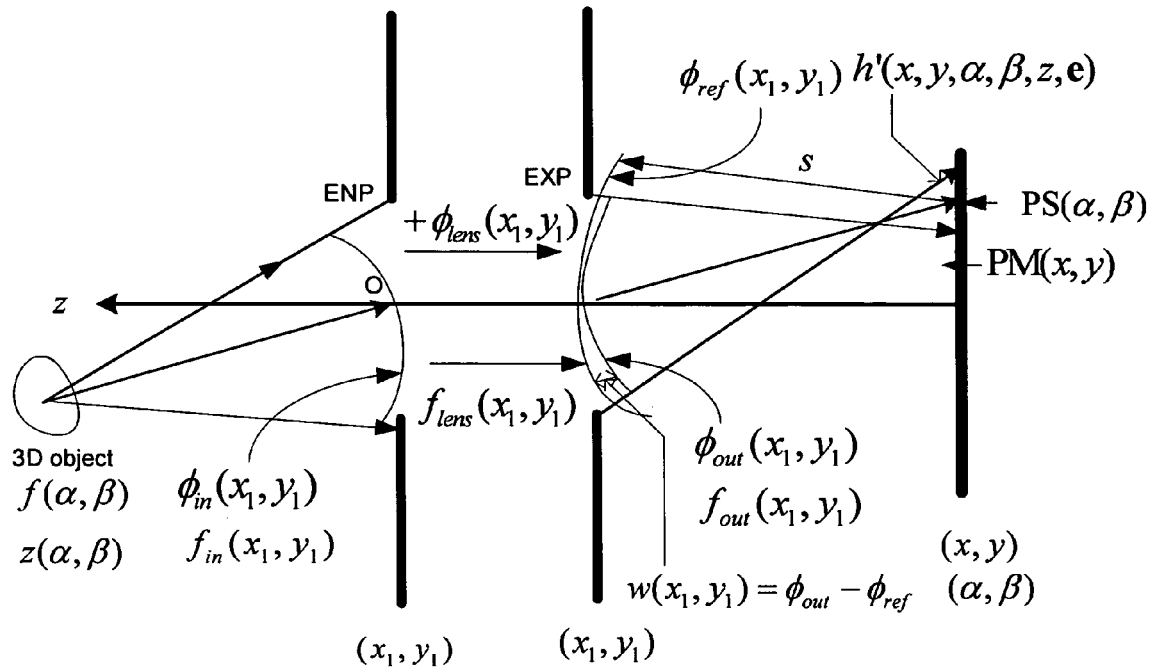

| | |
|---|---|
| $f(\alpha,\beta)$ | Object point source (focused image) |
| $z(\alpha,\beta)$ | 3D shape of object |
| | ENP: Entrance pupil |
| | EXP: Exit pupil |
| $\phi_{in}(x_1,y_1)$ | Phase of incident/input light wavefront /rays |
| $f_{in}(x_1,y_1)$ | Amplitude of incident/input light wavefront/rays |
| $\phi_{lens}(x_1,y_1)$ | Phase function added by lens/optical system |
| $f_{lens}(x_1,y_1)$ | Amplitude function added by the lens/optical system |
| $\phi_{out}(x_1,y_1)$ | Phase of emergent/output light wavefront/rays |
| $f_{out}(x_1,y_1)$ | Amplitude of emergent/output light wave front |
| $\phi_{ref}(x_1,y_1)$ | Phase of reference wavefront/rays for output needed for perfect focusing |
| $PS(\alpha,\beta)$ | Position of image point light source according to geometric optics |
| $PM(x,y)$ | Position of measurement of image irradiance/brightness |
| $w(x_1,y_1)$ | Aberration function |
| $h'$ | Shift-variant Point Spread Function (SV-PSF) |

Figure 2. Forward Image Formation Process

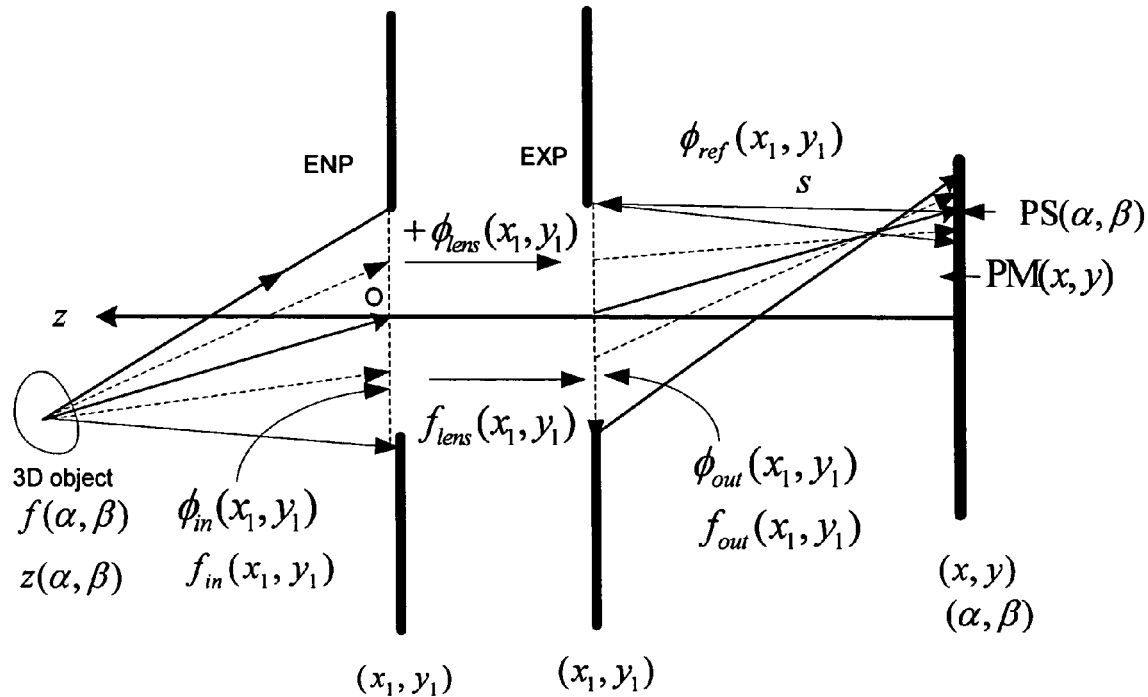

| | |
|---|---|
| $f(\alpha, \beta)$ | Object point source (focused image) |
| $z(\alpha, \beta)$ | 3D shape of object |
| | ENP: Entrance pupil |
| | EXP: Exit pupil |
| $\phi_{in}(x_1, y_1)$ | Angle of incidence of input light rays |
| $f_{in}(x_1, y_1)$ | Amplitude of incident/input light rays |
| $\phi_{lens}(x_1, y_1)$ | angle of refraction function added by lens system |
| $f_{lens}(x_1, y_1)$ | Amplitude function added by the lens system |
| $\phi_{out}(x_1, y_1)$ | Angle of emergence of exit/output light rays |
| $f_{out}(x_1, y_1)$ | Amplitude of emergent/output light rays |
| $\phi_{ref}(x_1, y_1)$ | Angle of emergence of of reference light rays that focus at PS. |
| $PS(\alpha, \beta)$ | Position of image point light source according to geometric optics |
| $PM(x, y)$ | Position of measurement of image irradiance/brightness |
| $w(x_1, y_1)$ | Ray Aberration function |
| | h' : Shift -variant Point Spread Function (SV-PSF) |

Figure 3. Similar to Figure 2, but light wavefronts are replaced by light rays.
Forward Image Formation Process $$\phi_{in}(x_1, y_1, z(\alpha, \beta))$$

$$\phi_{out}(x_1, y_1, F, \mathbf{z}) = \phi_{in}(x_1, y_1, \mathbf{z}) + \phi_{lens}(x_1, y_1, F)$$

$$f_{out}(x_1, y_1) = f_{in}(x_1, y_1) + f_{lens}(x_1, y_1)$$

$$w(x_1, y_1, s, F, \mathbf{z}) = \phi_{out}(x_1, y_1, F, \mathbf{z}) - \phi_{ref}(x_1, y_1, s)$$

$$h'(x, y, \alpha, \beta) = \xi(D, \lambda, \phi_{in}(z) + \phi_{lens}(F) - \phi_{ref}(s), x, y, \alpha, \beta)$$

$$h'(x, y, \alpha, \beta) = \xi(x, y, \alpha, \beta, z, D, F, s, \lambda)$$

$$h'(x, y, \alpha, \beta, z, \mathbf{e})$$

$$\mathbf{e} = (D, F, s, \lambda)$$

$$g(x, y) = \int_{-\infty}^{\infty} \int_{-\infty}^{\infty} h'(x, y, \alpha, \beta, \mathbf{e}, \mathbf{z}) \, f(\alpha, \beta) \, d\alpha \, d\beta$$

Figure 4. Relation between important quantities in forward image formation process.

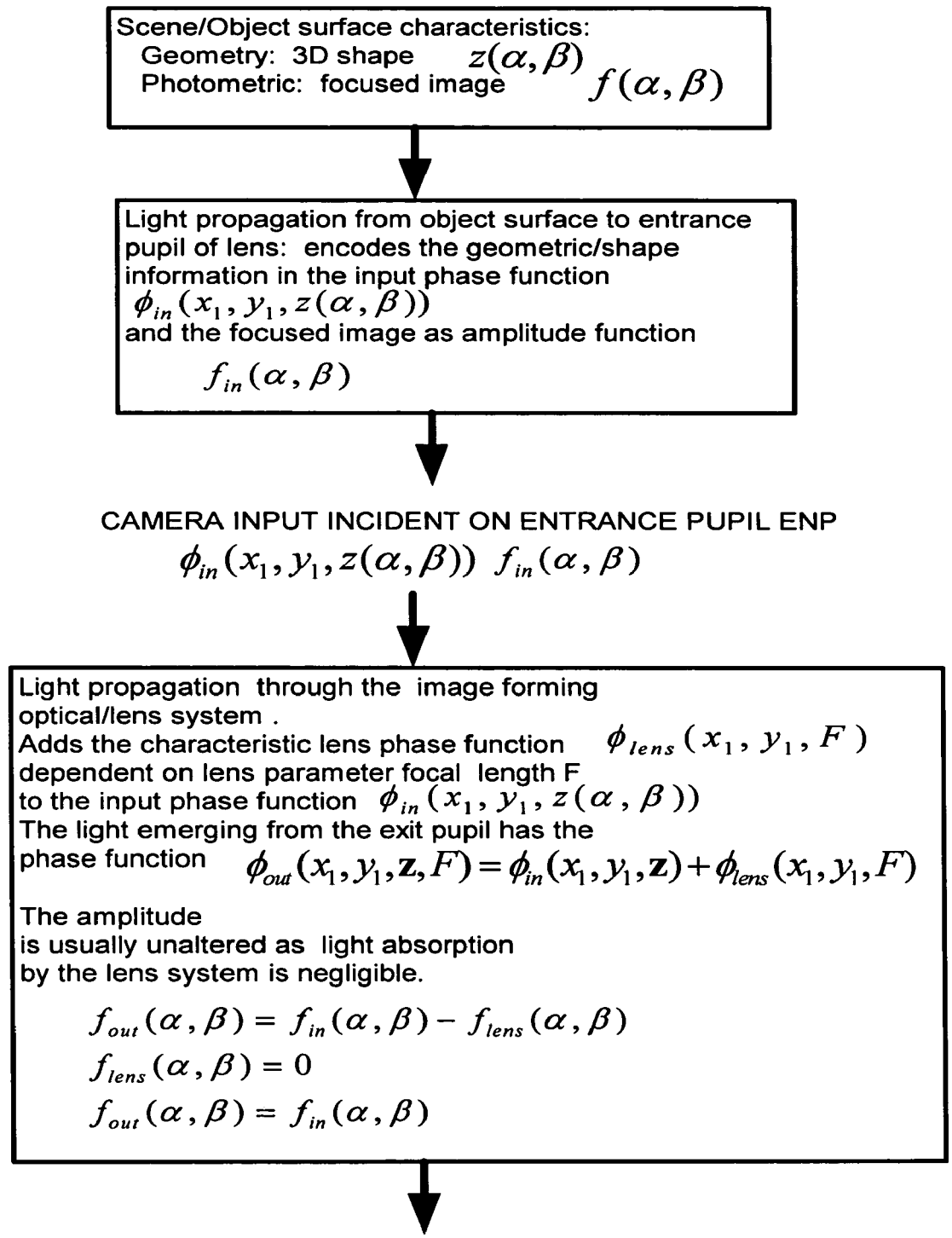
Figure 5A: Forward Image formation process (continured in Fig. 5B)

Light propagation from the exit pupil to the image detector. This effectively subtracts the reference
phase function, $\phi_{ref}(x_1, y_1, \alpha, \beta, s)$ which is a function of the camera parameter s.
This phase function corresponds to the phase
needed for perfect focusing of the object point.
The deviation of the actual light from the exit pupil
from the reference phase function represents the
light aberration function that causes a point to blur or
spread out on the image detector.

$$w(x_1, y_1, \alpha, \beta, s, F, z) = \phi_{out}(x_1, y_1, z, F) - \phi_{ref}(x_1, y_1, \alpha, \beta, s)$$

A point light source which would have focused at $PS(\alpha, \beta)$
according to geometric optics, spreads into a blurred light blob
specified by the non-localized shift-variant point spread function (SV-PSF)

$$h'(x, y, \alpha, \beta, e, z)$$

where e is the vector of camera parameters $e = (D, F, s, \lambda)$
on the image detector where the brightness is measured at the point $PM(x, y)$
The SV-PSF is determined by the light aberration function $$w(x_1, y_1, \alpha, \beta, s, F, z)$$

and the camera aperture diameter D.
The total measured image brightness at a point $PM(x, y)$
is the total sum of the brightness distribution produced at that point
by all point light sources in the vicinity of that point.

$$g(x, y) = \int_{-\infty}^{\infty} \int_{-\infty}^{\infty} h'(x, y, \alpha, \beta, e, z) f(\alpha, \beta) \, d\alpha \, d\beta$$

This summation step is the first place where the geometric information and
the photometric information are merged in a complex way to produce the
single measured quantity-- the image brightness. The main problem of
inverse optics then is to separate the photometric and geometric informations
given the blurred image.

Image/video data output $g(x, y)$

Figure 5B. (Continued from Fig. 5A) Forward Image Formation Process.

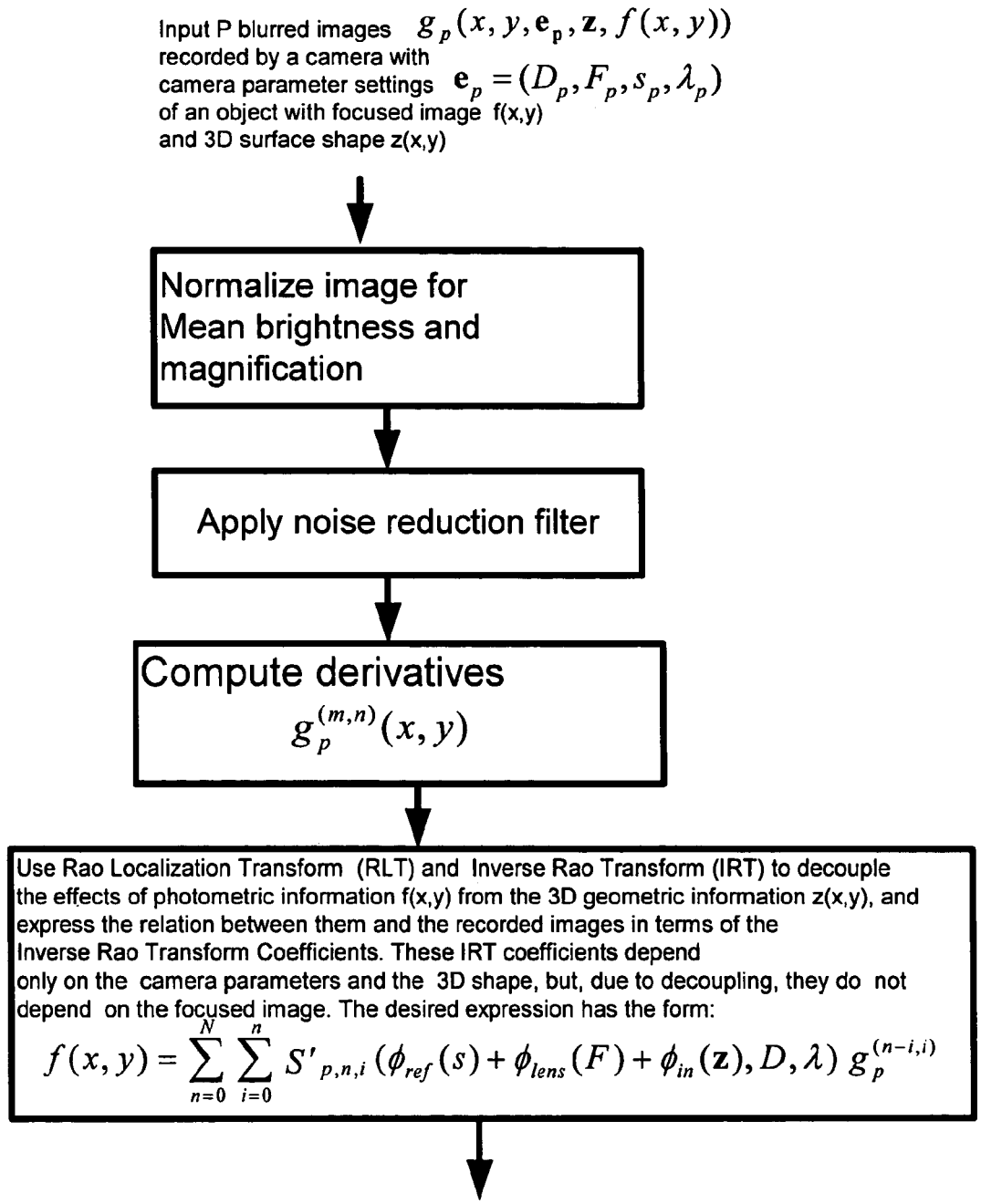
Figure 6A. Conceptual schematic diagram of Inverse Optics or Inverse Imaging in a Virtual Inverse Camera (VIC) (continued on Fig. 6B).

Propagate the light backwards from the image detector to the exit pupil of the lens/optical system by substituting numerical values for the reference phase function in terms of the distance S from the image detector to the exit pupil, to obtain an expression that does not contain the reference phase function $$f(x,y) = \sum_{n=0}^{N} \sum_{i=0}^{n} S'_{p,n,i} (\phi_{lens}(F) + \phi_{in}(\mathbf{z}), D, \lambda) \, g_p^{(n-i,i)}$$

Propagate the light backwards from the exit pupil to the entrance pupil of the lens/optical system by substituting numerical values for the lens phase function in terms of the focal length F to obtain an expression that does not contain the lens phase function $$f(x,y) = \sum_{n=0}^{N} \sum_{i=0}^{n} S'_{p,n,i} (\phi_{in}(\mathbf{z}), D, \lambda) \, g_p^{(n-i,i)}$$

Propagate the light backwards from the entrance pupil to the object surface in the scene by substituting for the lens phase function in terms of the camera parameters and the parameters of the 3D surface shape z to obtain $$f(x,y) = \sum_{n=0}^{N} \sum_{i=0}^{n} S'_{p,n,i} (\mathbf{z}) \, g_p^{(n-i,i)}$$

Solve the system of P equations $$f(x,y) = \sum_{n=0}^{N} \sum_{i=0}^{n} S'_{p,n,i} (\mathbf{z}) \, g_p^{(n-i,i)}$$

to obtain the focused image f(x,y) and the 3D shape z(x,y)

Output 3D shape z(x,y) and focused image f(x,y)

Figure 6B. (Continued from Fig. 6A) Conceptual schematic diagram of Inverse Optics or Inverse Imaging in a Virtual Inverse Camera (VIC).

Determine the incident or input phase function $\phi_{in}(x_1, y_1, z)$ at the entrance pupil ENP of the image forming optical system in terms of the 3D shape parameters z of the shape $z(\alpha, \beta)$ Determine the characteristic phase transfer function $\phi_{lens}(x_1, y_1, F)$ of the image forming lens/optical system in terms of the lens/camera parameters (e.g. Focal length F, refractive index, shape, thickness, and position of lens elements)

Determine the emergent or output phase function
$\phi_{out}(x_1, y_1, z, F) = \phi_{in}(x_1, y_1, z) + \phi_{lens}(x_1, y_1, F)$ Determine the characteristic reference phase function
$\phi_{ref}(x_1, y_1, s, \alpha, \beta)$ in terms of the camera parameter s that specifies the image detector position and point light source position $(\alpha, \beta)$ Determine the wave aberration function in terms of the camera parameters $w(x_1, y_1, \alpha, \beta, s, F, z) = \phi_{out}(x_1, y_1, z, F) - \phi_{ref}(x_1, y_1, \alpha, \beta, s)$ Figure 7A. Steps in determining the Shift-variant Point Spread Function h' (continued on Fig. 7B).

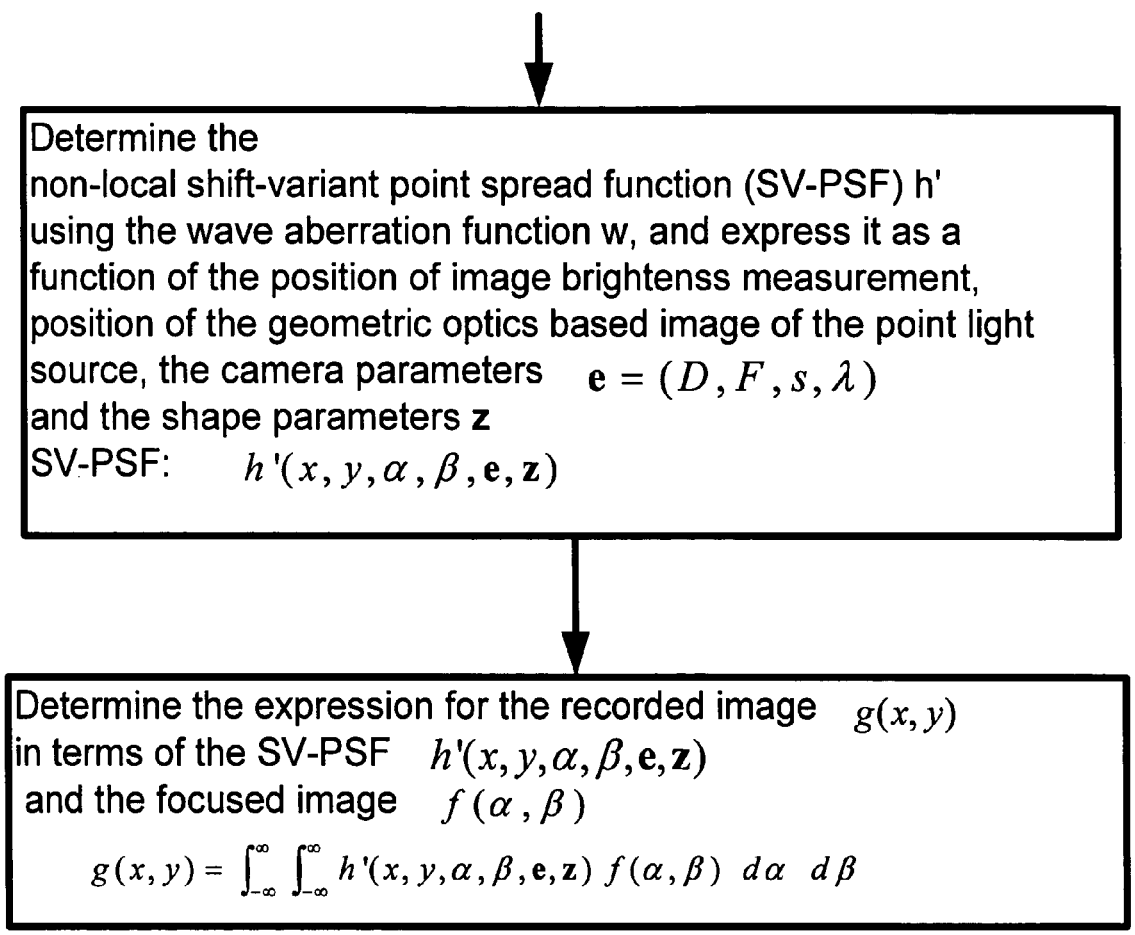
Figure 7B. (Continued from Fig. 7A) Steps in determining the Shift-variant Point Spread Function h'

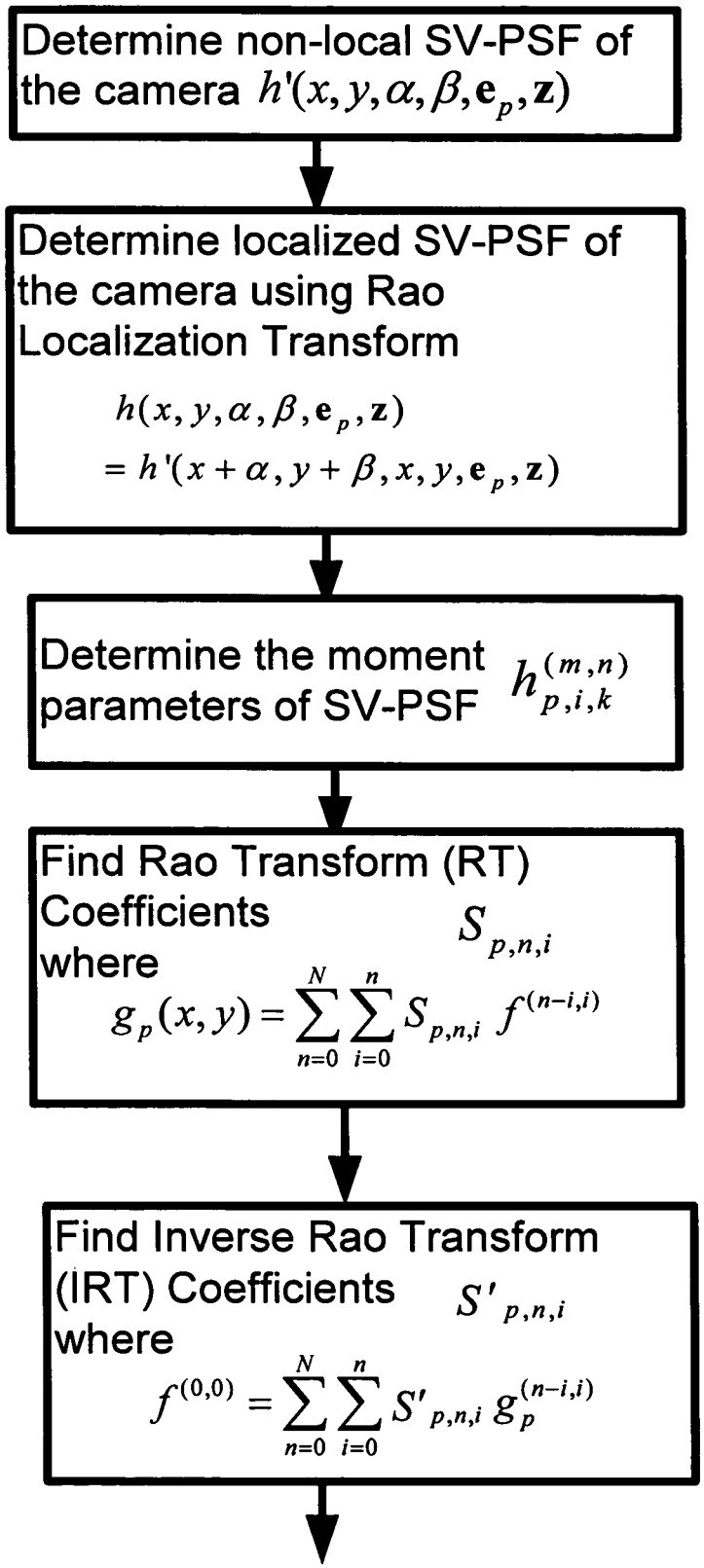
Figure 8A. Method of the invention: steps in inverse optics (continued in Fig. 8B)

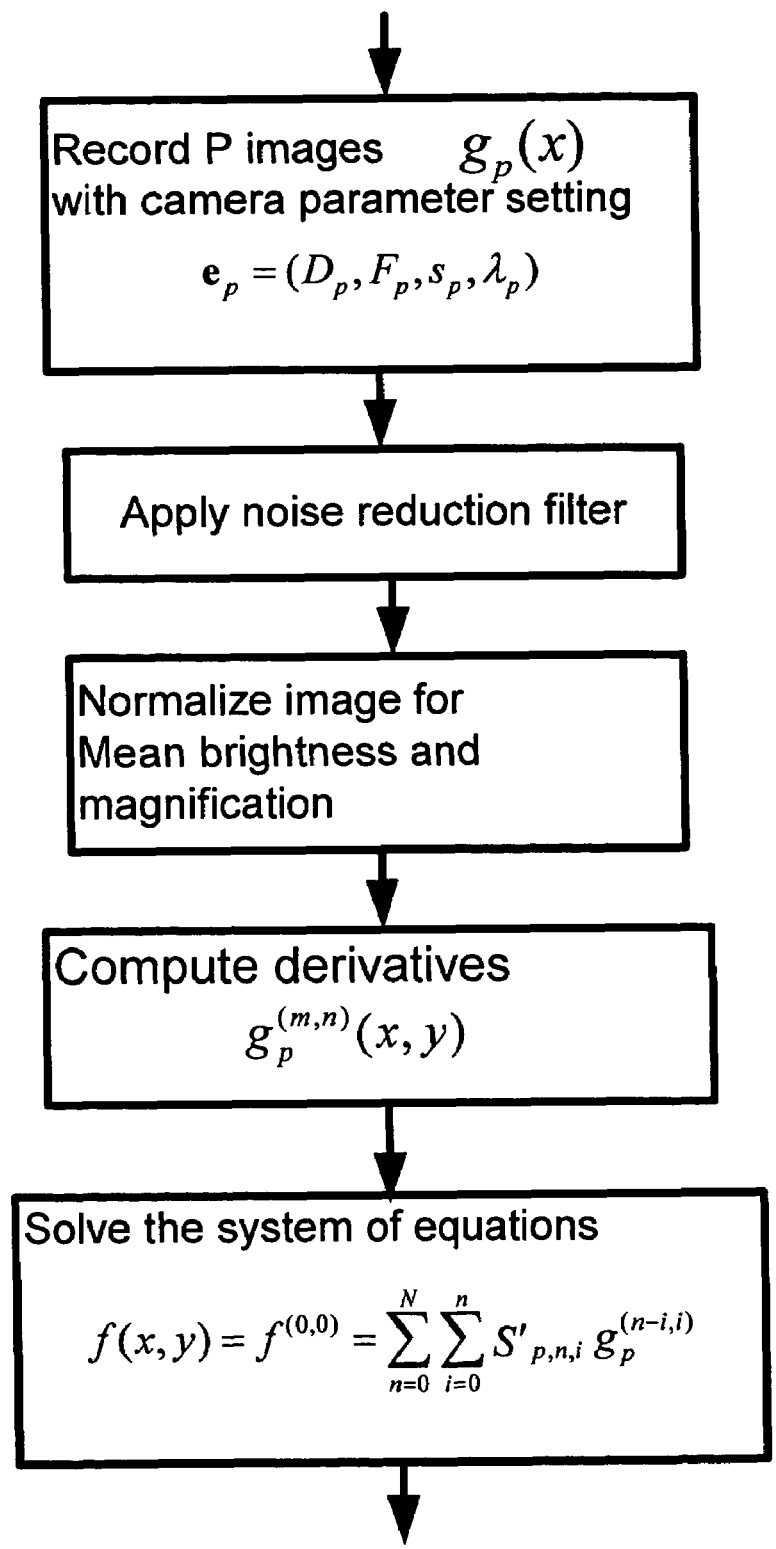
Figure 8B. (continued from Fig. 8A) Method of the invention: steps in inverse optics (continued in Fig. 8C)

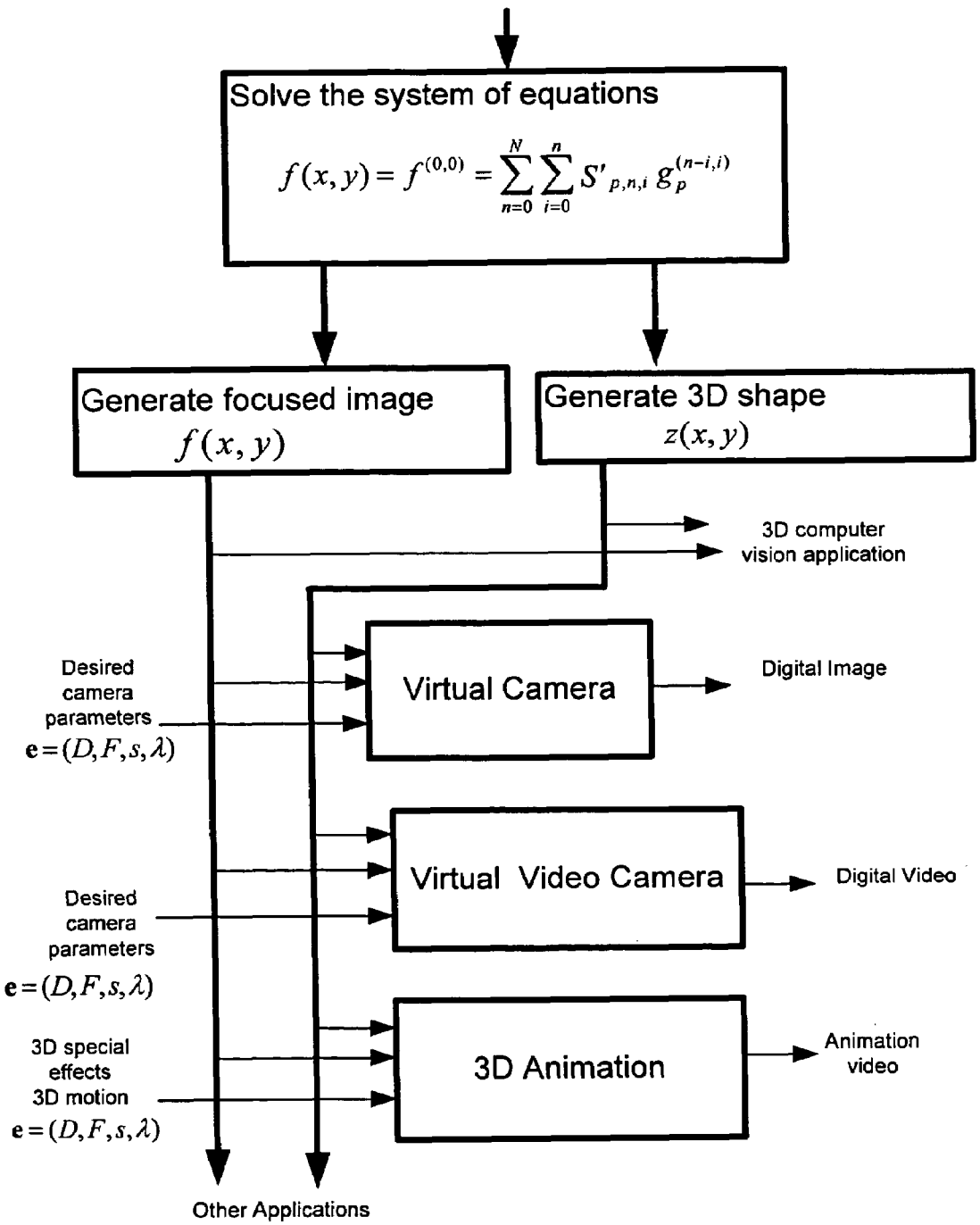
Figure 8C. (continued from Fig. 8B) Method of the invention: steps in focused image and 3D shape generation, Virtual Camera, Virtual Video Camera, and 3D Animation.

DIRECT VISION SENSOR FOR 3D COMPUTER VISION, DIGITAL IMAGING, AND DIGITAL VIDEO

This patent application is a continuation of the following Provisional Patent Application filed by this inventor:

M. Subbarao (Rao), "Direct Vision Sensor for 3D Computer Vision, Digital Imaging, and Digital Video", USPTO Application No. 60/691,358, Filing date: Jun. 18, 2005.

This patent application is substantially and essentially the same as the above Provisional Patent Application. The main differences are in minor improvement to the description of the method of the present invention and clearly specified claims.

1.1 BACKGROUND OF THE INVENTION

The present invention relates to a method and an associated apparatus for directly sensing both the geometric and photometric visual information in a three-dimensional (3D) scene. Geometric information specifies the three-dimensional geometry or shape of visible surfaces in the scene. Photometric information specifies the brightness and color of visible surfaces in the scene. The method and apparatus are based on a novel mathematical transform named Rao Transform (RT) for accurately modeling the forward image formation process in a camera which is in general a linear shift-variant integral operation. This new transform and its inverse—the Inverse Rao Transform (IRT)—were invented recently by the author of the present invention. IRT facilitates accurately inverting the shift-variant image formation and sensing in a digital camera to recover the 3D scene. While RT provides an exact method for modeling the forward optics in an image forming optical system, IRT provides a direct and exact method for inverse optics or inverting the image formation in an optical system to recover the visual information in a 3D scene. Therefore, the method of the present invention is named the Direct Vision Sensing Method (DVSM) and the apparatus of the present invention is named the Direct Vision Sensor(DVS).

The 3D geometric and photometric information of the scene recovered using the Rao Transform is used in computer vision applications. Also, this 3D scene information is provided as input to a virtual digital camera which computes the digital still image. This same 3D information for a time-varying scene is used by a virtual video camera to compute and produce digital video data. This video data generation method can be used to create animation videos by modifying the photometric and 3D geometric information based on desired 3D motion, deformation, color change, illumination change, etc., and then computing the video data for a camera with desired camera parameters.

1.2 DESCRIPTION OF PRIOR ART

Finding the geometric and photometric information in a 3D scene using a camera system has applications in the fields of robotic/machine vision, digital imaging, and videography. A method and apparatus for finding such 3D information is disclosed in the patent "Passive ranging and rapid autofocusing," U.S. Pat. No. 5,148,209, Sep. 15, 1992, by the author of this present invention (M. Subbarao).

However, this method and apparatus are useful only when the 3D geometry of the scene is approximated by a piecewise constant plane perpendicular to the line of sight. In other words, the image formation process is approximated by a piecewise linear shift-invariant or convolution operation. However, in general, the image formation process should be modeled by a linear shift-variant operation instead of a shift-invariant operation due to the complex shape of objects in the 3D scene such as inclined planes or curved surfaces instead of a plane perpendicular to the line of sight.

Another method that uses a linear shift-variant imaging model is disclosed by

P. Favaro and S. Soatto, in "A geometric approach to shape from defocus" (http://www.vision.cs.ucla.edu/papers/favaroSoatto05PAMI.pdf), IEEE Transactions on Patt. Anal. and Mach. Intell., Vol. 27, No. 3, March 2005.

But this method is based on regularization which is a heuristic assumption. This assumption is often incorrect in a physical camera. Another method is disclosed by Rajagopalan and Choudhury (S. Chaudhuri and A. Rajagopalan. *Depth from defocus: a real aperture imaging approach*, Springer Verlag, 1999).

It is based on a statistical approach (e.g. maximum likelihood estimation) which is again a heuristic approach rather than physical reality. Therefore, this method too would often yield incorrect or approximate results in practice rather than accurate results. None of the prior techniques use a method where the linear shift-variant operation that takes place in the image formation process is inverted exactly as is done in the method of the present invention. In the method of the present invention, the novel Inverse Rao Transform provides an exact method for inverting the shift-variant image formation process in practical camera systems. Application of Rao Transform to the restoration of shift-variant blurred images is described in:

M. Subbarao (Rao), "Methods and apparatus for computing the input and output signals of a linear shift-variant system", U.S. patent application Ser. No.: 11/235724, filed on Sep. 26, 2005.

Application of Rao Transform to solving integral and differential equations is described in:

M. Subbarao, "Unified and localized method and apparatus for solving linear and non-linear integral, integro-differential, and differential equations", U.S. patent application Ser. No.: 11/242191, filed on Oct. 3, 2005.

1.3 SUMMARY OF THE INVENTION

An object of the present invention is a Direct Vision Sensing Method (DVSM) and a Direct Vision Sensor (DVS) apparatus for recovering the 3D geometry (i.e. shape of visible surfaces) and photometry (i.e. focused images) of scenes using an accurate modeling of the imaging process. This accurate modeling of the imaging process is made possible by the Rao Transform (RT) which is a novel mathematical transform invented recently by the author of the present invention. The 3D scene information is recovered directly by inverting the image formation process in a camera system. This inversion process is accomplished using the novel Inverse Rao Transform (IRT) invented by the author of the present invention.

Another object of the present invention is a method and an apparatus for digital imaging of a 3D scene by a camera with desired camera parameters. The camera parameters include the aperture diameter (D) of the camera, focal length (F), image detector position (S), and the spectral sensitivity wavelength ($\lambda$) of the image detector.

A further object of the present invention is a method of estimating system parameters and recovering input signal in any instrument that can be modeled as a linear shift-variant system.

The method of determining the shape $z(x,y)$ and the focused image $f(x,y)$ of an object includes the steps below.

1. A set of P images $g_p(x,y)$ with different camera parameter settings $e_p=(D_p,s_p,f_p,\lambda_p)$ for $p=1,2,3, \ldots, P$, is captured.
2. All of the captured images are preprocessed to obtain a set of normalized images. The normalized images are such that each is equal to the linear integral of the product of the focused image of the object with a corresponding shift-variant (SV) point spread function (PSF) of the camera characterized by the respective set of camera parameter values.
3. A set of derivatives $g_p^{(m,n)}(x,y)$ of the normalized images are computed to obtain a set of image derivatives where m and n are the order of the derivatives with respect to x and y respectively. Here, m and n are integers 0, 1, 2, 3, . . . , etc.
4. If the original PSF h' is not localized, then determine the localized PSF h from non-localized PSF h' using the novel Rao Localization Transform (RLT) invented recently by the author of the present invention as follows:

$h(x,y,\alpha,\beta;e_p,z)=h'(x+\alpha,y+\beta,x,y;e_p,z)$.

5. Derive a set of expressions for the various moments of the derivatives of the SV-PSF $h_{i,j}^{(m,n)}(x,y,\alpha,\beta;e_p,z)$ in terms of the camera parameters and shape parameters.
6. Derive a system of P equations that expresses the focused image $f(x,y)$ as a weighted sum of the derivatives of the normalized images $g_p^{(m,n)}(x,y)$. This is done using the Inverse Rao Transform (IRT) for shift-variant image blurring. The weighting coefficients for the image derivatives are the IRT coefficients. These coefficients are expressed as functions of the camera parameters $e_p$ and the shape parameters z.
7. Solve the resulting system of algebraic equations to obtain all the unknowns including the focused image $f(x,y)$ and the 3D shape $z(x,y)$ in terms of its parameters. The equations are in general linear algebraic equations posing no difficulty in solving them. The shape parameters may include object distance, slope, curvature, etc., at a point. The focused image could be used as the image output of a digital camera, and the shape information could be used in robot/computer vision applications.
8. In the method of digital imaging, the focused image and 3D shape parameters obtained in Step 7 above, along with desired camera parameters are provided as input to a virtual camera implemented in software. This virtual camera performs computer simulation of a camera with given camera and scene parameters, and generates the image that would be recorded by a corresponding real physical camera.
9. In the method of digital video recording, digital imaging as in Step 8 above is performed at a series of time instants that are a very small time interval apart (e.g. 1/30 of a second) for a dynamic or changing 3D scene, and the image frames thus computed at a sequence of successive time instants are synthesized in software to produce a video recording of the scene.
10. In the method of generating animation video, the focused mage $f(x,y)$ and shape $z(x,y)$ are first computed as in Step 7 above. Then, this information is modified suitably as desired to get a new focused image $f'(x,y)$ and $z'(x,y)$. The change may include color change, shape deformation, change in lighting, etc. Further, effects of 3D motion including translation and rotation can be included to generate the new image $f'(x,y)$ and shape $z'(x,y)$. These can be taken as input along with the parameters of a new virtual camera and an animation video is generated using an animation software.

1.4 ADVANTAGES

An important advantage of the present invention is that it does not involve using approximations or heuristics in recovering the 3D shape parameters of a scene. This is accomplished by accurately modeling the image formation process (which is shift-variant) in a camera based on the novel Rao Transform. The focused image and the 3D shape parameters are obtained using the inverse Rao Transform.

The present invention is not restricted by the form of the point spread function of the camera. It is applicable to any camera system that can be modeled as a linear shift-variant system. Therefore it is applicable even in the presence of significant optical aberrations and image distortion caused by diffraction. In particular, the present invention is applicable but not restricted to Gaussian, cylindrical, an physical/wave optics based point spread functions. In the present invention, the Point Spread Function is characterized completely in terms of the relevant camera parameters, and shape parameters, thus accounting for diffraction effects and lens aberrations.

The present invention is also general and therefore many camera parameters can be changed simultaneously instead of changing only one camera parameter at a time. Further, it generalizes the method of determining shape and focused image to determining other camera parameters that may be unknown. It also generalizes the method to any linear shift-variant system for estimating any number of system parameters and estimating the input signal.

Further advantages of the present invention will become apparent hereinafter to those with ordinary skill in the art to which the present invention pertains.

2. BRIEF DESCRIPTION OF THE DRAWINGS

For a further understanding of the objects of the present invention, reference is made to the following description of the preferred embodiment which is to be taken in connection with the accompanying drawings.

FIG. 1 shows a block diagram of the Direct Vision Sensor. A surface patch of an object in the 3D scene is illuminated by a light source. Part of the light is reflected by the surface patch. For each point on the surface patch, a cone of light rays can be visualized with the tip of the cone at the point on the surface and the base of the cone located at the aperture of the camera or lens. These light rays are intercepted and refracted by the lens and an image is formed on the image detector. In terms of wave or physical optics, the light reflected from the point on the surface patch propagates as a wavefront and part of this wavefront is intercepted by the lens aperture or the entrance pupil. The input to the camera is this wavefront. This wavefront encodes the photometric information $f(x,y)$ in the form of the amplitude of the wavefront. Amplitude is used to recover the focused image of the surface patch. The amplitude distribution is assumed to remain constant at each point on the entrance pupil or the aperture. This is a fairly accurate approximation as the aperture diameter D is usually much smaller than the distance of the surface patch from the aperture.

The phase distribution function $\phi_{in}(x_1,y_1)$ on the entrance pupil encodes the distance and shape information. This phase distribution is exploited for recovering the distance and shape $z(x,y)$ of the surface patch. By recovering and synthesizing the focused image and shape of each visible surface patch in the scene, the full focused image and shape or geometry of the entire visible scene can generated.

The diameter of the aperture is denoted by D. The camera includes an image forming lens or an optical system with focal length F. Lens to image detector distance is S and the color or wave length channel sensed by the image detector is $\lambda$. A camera controller can control these camera parameters $e=(D,F,s,\lambda)$.

Direct Vision Sensor also includes an image processing computer with software components for (i) image normalization for standardizing the image with respect to mean or average brightness and magnification, (ii) smoothing or noise reduction filter, (iii) image derivative computation, (iv) Inverse Rao Transform coefficient computation, (v) algebraic equation solving, and optionally, (vi) Virtual image/video camera simulation, and (vii) 3D animation computation.

FIG. 2. illustrates the forward image formation process in terms of wave optics. A wavefront originating from the object surface patch propagates to the entrance pupil. The amplitude of this wavefront contains the photometric information and the phase of this wavefront contains the geometric information. The diverging incident wave front becomes a roughly converging wavefront after propogation through the lens/optical system. This can be modeled by adding a phase function $\phi_{lens}(x_1,y_1)$ which is a characteristic of the lens/optical system (or its focal length F). Therefore the wavefront that emerges from the exit pupil is given by $\phi_{out}(x_1,y_1)=\phi_{in}(x_1,y_1)+\phi_{lens}(x_1,y_1)$. Usually, the amplitude is not changed as the light absorbed by the lens/optical system is negligible, i.e $f_{out}(x_1,y_1)=f_{in}(x_1,y_1)=f_{lens}(x_1,y_1)=f(x_1,y_1)$.

If PS is a point on the image detector where the image of the point on the surface is formed according to geometric optics, then a hypothetical spherical wavefront emerging from the exit pupil that would converge perfectly at the point PS serves as a reference wavefront $\phi_{ref}(x_1,y_1)$. The deviation of the actual wavefront emerging from the exit pupil from this reference wavefront defines the wave aberration function $w(x_1,y_1)=\phi_{out}(x_1,y_1)+\phi_{ref}(x_1,y_1)$. This aberration function determines the SV-PSF of the optical system.

PM is the point where image brightness is measured. Since the SV-PSF spreads into a blob, the point source corresponding to the geometric image at PS contributes some value to the brightness measured at PM.

FIG. 3. is almost identical to FIG. 2 showing the forward image formation process, but light wavefronts are replaced by light rays. This Figure is included to emphasize the fact that the method of the present invention can be extended to the ray optics model of image formation. In this case, the wavefront phase functions can be replaced by functions that specify the unit vectors of rays at each point of the entrance pupil, exit pupil, the effect of the lens system, and the effect of the point PS by considering a reference cone of rays. The SV-PSF can be computed by considering the deviation/difference between the unit vectors of actual rays and the reference rays.

FIG. 4. shows the relation between important quantities in the forward image formation process in terms of wave optics.

FIGS. 5A and 5B show a detailed model of the forward image formation process.

FIGS. 6A and 6B show a conceptual schematic diagram of inverse optics or inverse imaging in a Virtual Inverse Camera (VIC).

FIGS. 7A and 7B show steps in determining the Shift-variant Point Spread Function (SV-PSF) h'.

FIGS. 8A, 8B, and 8C show the Method of the present invention. They include steps in inverse optics, steps in focused image and 3D shape generation, Virtual Camera, Virtual Video Camera, and 3D Animation.

3. DETAILED DESCRIPTION OF THE PREFERRED EMBODIMENTS

FIG. 1 shows the Direct Vision Sensor (DVS), the camera system structure, camera parameters, and the software components. The camera is characterized by a set of camera parameters. The camera parameters are: (i) the distance s between the lens/optical system and the image detector, (ii) the diameter D of the camera aperture, (iii) the focal length F of the optical system, and (iv) the spectral sensitivity characteristic $\lambda$ of the image detector. The values of the camera parameters s, f, $\lambda$, and D, are changed or adjusted as needed using a camera controller. This set of camera parameters are grouped together into a vector and denoted by $e=(D,F,s,\lambda)$.

The input from the scene to the camera are the focused image $f(x,y)$ of the scene, and the geometry or 3D shape $z(x,y)$ of the scene. The focused image $f(x,y)$ specifies the amount of light received from a particular direction of the scene specified by $(x,y)$. The geometry $z(x,y)$ specifies the 3D shape of the object with respect to the camera along the direction specified by $(x,y)$. The values of the set of camera parameters $\{\lambda,s,f,D\}$ are set by the camera controller. The output of the camera is a recorded image $g(x,y)$ which is in general blurred. The output of the camera corresponding to different camera parameter settings/values $e_p=\{\lambda_p,s_p,f_p,D_p\}$, is denoted by $g_p(x,y)$ for $p=1,2,\ldots,P$. The value of P, the number of different camera parameter settings and corresponding images $g_p(x,y)$ recorded, is at least as large as the total number of shape parameters in z plus 1, where the extra 1 is needed to account for the focused image parameter $f(x,y)$ which is also unknown. When images are noisy, in order to reduce the effects of noise and obtain more accurate results, one may use more images than the required minimum by increasing the value of P.

DVS includes an image processing computer with the following software components (i) Image normalization and smoothing or noise filtering software, (ii) Image derivative computation software, (iii) Inverse Rao Transform coefficient computation software, (iv) Algebraic equation solving software. Optional software components include (v) Virtual image/video camera software which can generate image/video data given 3D scene parameters, i.e. focused image $f(x,y)$ and shape $z(x,y)$, and given the new camera parameters $e'=(D',F',s',\lambda')$. It may also include a 3D animation software component when animation video is needed as output. In this case also, the scene parameters, new camera parameters, and any 3D motion and shape parameters needed for animation, are all taken as input by the image processing computer so that the desired animation can be generated as output.

The noise filtering or smoothing software is applied to image data to reduce the effects of noise. The image normalization software is used to convert different images recorded with different values for the set of camera parameters $e_p$ to a standard format. This conversion process is called image normalization. Typical normalization steps include mean/average brightness normalization so that mean brightness of different images are the same, and magnification normalization so that the magnification of different images are all the same. The normalization processing is such that the resulting images will be related to the focused image $f(x,y)$ by a linear definite integral of the product of the focused image f(x,y) and a non-local shift-variant point spread function (SV-PSF) h'(x, y,α,β,$e_p$,z) characterized by the camera parameters $e_p$ and the shape parameters z. As explained later, the shape parameters typically include object distance, slopes of the tangential plane, local curvature of the surface of the object or scene, etc.

The non-local point spread function of the camera is denoted by h'(x,y,α,β,$e_p$,z) where (x,y) specifies the position where the brightness is measured, and (α,β) is the position of the corresponding point source. Also $e_p = \{\lambda_p, s_p, f_p, D_p\}$ denotes the values of the set of camera parameters corresponding to a specific value of p where p=1,2,3, . . . , P. z denotes the shape parameter vector defined as below.

Surface shape is represented by the function z(x,y) where, $$z(x, y) = \sum_{k=0}^{K} \sum_{n=0}^{k} z^{(n,k-n)} x^n y^{k-n} \quad (1)$$

$$z^{(n,k-n)} \equiv \frac{\partial^n}{\partial x^n} \frac{\partial^{k-n}}{\partial y^{k-n}} z(x, y) \quad (2)$$

$$z \equiv (z^{(0,0)}, z^{(1,0)}, z^{(0,1)}, z^{(2,0)}, z^{(1,1)}, \ldots, z^{(0,K)}) \quad (3)$$

Note that the components of the shape parameter vector z can be associated with meanings such as:

$z^{(0,0)}$ represents the surface distance at the image point (x,y), $z^{(1,0)}$ represents the horizontal slope of the tangent plane of the surface at (x, y), $z^{(0,1)}$ represents the vertical slope of the tangent plane of the surface at (x, y), $z^{(2,0)}$ represents the horizontal curvature of the surface at (x,y), etc. Theoretically, K can be very large depending on the desired accuracy. However, in practice, since image measurement and estimating its derivatives cannot be done accurately, K is limited in practice to be 0, 1, or 2 at most. If K is limited to 0, then the object surface in a small field of view is approximated by a flat surface at a constant distance. When K is set to 1, then the surface in a small field of view is approximated by its tangent plane. A tangent plane has both distance and slopes associated with it, but no curvature. When K is set to 2, then the surface in a small field of view is approximated by a quadratic surface patch which can have non-zero curvature associated with it in addition to distance and slopes. In many practical applications, K=1 suffices. However, theoretically, the method of the present invention does not impose any restriction on the value of K. It can be a very large number without any limit.

The relation between the shift-variant blurred image, the focused image, and the non-localized shift-variant point spread function (SV-PSF) is given by $$g_p(x,y) = \int_{-\infty}^{\infty} \int_{-\infty}^{\infty} h'(x,y,α,β,e_p,z) f(α,β) dα dβ \quad (4)$$

The method of the present invention uses a relation equivalent to the above equation. This equivalent relation is derived using the Rao Localization Transform (RLT) which was invented recently by the author of the present invention. A localized SV-PSF h(x,y,α,β,$e_p$,z) is defined in terms of the non-localized SV-PSF as follows:

$$h(x,y,α,β,e_p,z) = h'(x+α, y+β, x, y, e_p, z) \quad (5)$$

Using the new localized SV-PSF, we use the Rao Transform (RT) to relate the shift-variant blurred image and the focused image as below:

$$g_p(x,y) = \int_{-\infty}^{\infty} \int_{-\infty}^{\infty} h(x-α, y-β, α, β, e_p, z) f(x-α, y-β) dα dβ \quad (6)$$

In the above equation, h(x,y,α,β,$e_p$,z) is the SV-PSF where x and y are shift-variance variables and α and β are spread function variables. It should be noted that Equation (6) is exactly equivalent to Equation (4). This can be proved using Equation (5).

The following notation will be used to represent partial derivatives of $g_p(x,y)$, f(x,y), and the moments of h(x,y,α,β,$e_p$,z):

$$g_p^{(m,n)} = \frac{\partial^m}{\partial x^m} \frac{\partial^n}{\partial y^n} g_p(x, y) \quad (7)$$

$$f^{(m,n)} = \frac{\partial^m}{\partial x^m} \frac{\partial^n}{\partial y^n} f(x, y) \quad (8)$$

$$h_p^{(m,n)} = h^{(m,n)}(x, y, α, β, e_p, z) = \frac{\partial^m}{\partial x^m} \frac{\partial^n}{\partial y^n} h(x, y, α, β, e_p, z) \quad (9)$$

$$h_{p,i,k}^{(m,n)} = h_{p,i,k}^{(m,n)}(x, y, α, β) \quad (10)$$

$$= \int_{-\infty}^{\infty} \int_{-\infty}^{\infty} α^i β^k \frac{\partial^m}{\partial x^m} \frac{\partial^n}{\partial y^n} h(x, y, α, β, e_p, z) dα dβ$$

for m, n, i, k, p = 0, 1, 2, ⋯.

Using the above notation, the Taylor series expansion of f(x−α, y−β) around (x,y) up to order N and that of h(x−α, y''β, α,β,$e_p$,z) around the point (x,y,α,β) up to order M are given by $$f(x - α, y - β) = \sum_{n=0}^{N} a_n \sum_{i=0}^{n} C_i^n α^{n-i} β^i f^{(n-i,i)} \quad (11)$$

$$h(x - α, y - β, α, β, e_p, z) = \sum_{m=0}^{M} a_m \sum_{j=0}^{m} C_j^m α^{m-j} β^j h_p^{(m-j,j)} \quad (12)$$

where $C_i^n$ and $C_j^m$ are the binomial coefficients defined by $$C_p^k = \frac{k!}{p!(k-p)!} \quad (13)$$

and $a_m$ and $a_n$ are constants defined by $$a_k = \frac{(-1)^k}{k!}. \quad (14)$$

In theory, there is no limit to the values of M and N. They can be very large integers. Larger their value, more accurate the image formation model. However, in practical applications, both of them will have values of 4 or less because computing the derivatives of order higher than 4 gives very noisy images. This noise is a result of the limited measurement accuracy (e.g. quantization of images to 8 or 16 bits, and the presence of electronic noise) of the image sensor technology. It is not a result of the method of the present invention. If image brightness can be measured with more accuracy, then larger values can be used for M and N yielding correspondingly more accurate results. Therefore, in theory, the method of the present invention does not have a limitation on accuracy.

Substituting the above expressions into the Rao Transform of Eq. (6) and simplifying, we get $$g_p(x, y) = \sum_{n=0}^{N} a_n \sum_{i=0}^{n} C_i^n f^{(n-i,i)} \sum_{m=0}^{M} a_m \sum_{j=0}^{m} C_j^m h_{p,m+n-i-j,i+j}^{(m-j,j)} \quad (15)$$

The above equation, can be rewritten as $$g_p(x, y) = \sum_{n=0}^{N} \sum_{i=0}^{n} S_{p,n,i} f^{(n-i,i)} \quad (16)$$

where $$S_{p,n,i} = a_n C_i^n \sum_{m=0}^{M} a_m \sum_{j=0}^{m} C_j^m h_{p,m+n-i-j,i+j}^{(m-j,j)} \quad (17)$$

We can now write expressions for the various partial derivatives of g as $$g_r^{(p,q)} = \sum_{n=0}^{N} \sum_{i=0}^{n} \frac{\partial^p}{\partial x^p} \frac{\partial^q}{\partial y^q} [S_{r,n,i} f^{(n-i,i)}]. \quad (18)$$

for $p+q=0,1,2,\ldots,N$. Here r is an integer taking the values $1,2,3,\ldots,P$. It was earlier denoted by p, but changed to r to avoid confusion. Note that $$S_{r,n,i}^{(p,q)} = \frac{\partial^p}{\partial x^p} \frac{\partial^q}{\partial y^q} S_{r,n,i} f^{(n-i,i)} = a_n C_i^n \sum_{m=0}^{M-(p+q)} a_m \sum_{j=0}^{m} C_j^m h_{r,m+n-i-j,i+j}^{(m-j+p,j+q)} \quad (19)$$

and $$\frac{\partial^p}{\partial x^p} \frac{\partial^q}{\partial y^q} f^{(n-i,i)} = f^{(n-i+p,i+q)}. \quad (20)$$

The above equation for $g_r^{(p,q)}$ for $p,q=0,1,2,\ldots,N$ and $0 \leq p+q \leq N$ constitute $(N+1)(N+2)/2$ equations in as many unknowns $f^{(p,q)}$. The system of equations for $g_r^{(p,q)}$ can be expressed in matrix form with a suitable RT coefficient matrix of size $(N+1)(N+2)/2$ rows and columns. These equations can be solved algebraically to obtain $f^{(p,q)}$, and in particular, $f^{(0,0)}$ in terms of the camera parameters $e_p$ and the shape parameters z. The solution for $f^{(0,0)}$ can be expressed as $$f(x, y) = f^{(0,0)} = \sum_{n=0}^{N} \sum_{i=0}^{n} S'_{p,n,i} g_p^{(n-i,i)} \quad (21)$$

where $S'_{p,n,i}$ are the Inverse Rao Transform (IRT) coefficients. These coefficients depend both on the camera parameter setting $e_p$ and the shape parameter z. Therefore they can be denoted by $S'_{p,n,i}(z)$ to explicitly show their dependence on shape. Therefore the above equation can be written explicitly in terms of the unknown focused image and the unknown shape parameters $z=(z^{(0,0)}, z^{(1,0)}, z^{(0,1)}, z^{(2,0)}, \ldots)$ as $$f(x, y) = f^{(0,0)} = \sum_{n=0}^{N} \sum_{i=0}^{n} S'_{p,n,i}(z) g_p^{(n-i,i)} \text{ for } p = 1, 2, 3, \cdots, P, \quad (22)$$

where P is more than or equal to the total number of unknowns which is the total number of unknown shape parameters $z^{(m,n)}$ plus one more due to the focused image $f^{(0,0)}$ which is also unknown. Above we have a system of P equations where the total number of unknowns is P or less. Therefore, they can be solved in general to obtain all the unknowns which comprise the focused image $f^{(0,0)}$ and the shape parameters $z^{(m,n)}$.

The solution for the focused image f(x,y) can be generated as output of the DVS when it needs to be used as a digital still camera or a digital video camera for time-varying imagery. In 3D computer vision applications, in addition to the focused image/video, the 3D shape parameters z can also be generated as output. In the case of a Virtual Camera application, the scene description provided by f(x,y) and z along with a new desired set of camera parameters $e'=(D',F',s',\lambda')$ can be used to generate a new set of images. For example, Equation (16) can be used to generate new images or video that would be recorded by a real camera with the camera parameters $e'=(D', F',s',\lambda')$ using the virtual camera software. Similarly, in 3D animation applications, the information on how image f(x,y) and shape z(x,y) should be changed with time depending on motion and shape deformation parameters is used to generate the desired animation video output.

EXAMPLE 1

Gaussian SV-PSF

There are many models for the point spread function of a camera. The method of the present invention is applicable to all models. To illustrate the method of the present invention, first a popular model of the point spread function which is a Gaussian function is considered. Later, another model derived from paraxial geometric optics is considered. When the SV-PSF is a 2D Gaussian, the non-localized SV-PSF h' is given by $$h'(x, y, \alpha, \beta, e_p, z(\alpha, \beta)) = \frac{1}{2\pi\sigma_p^2(\alpha, \beta, z(\alpha, \beta))} \exp\left(-\frac{(x-\alpha)^2 + (y-\beta)^2}{2\sigma_p^2(\alpha, \beta, z(\alpha, \beta))}\right) \quad (23)$$

Note that, with this definition, Equation (4) that gives the relation between the shift-variant blurred image and the focused image will be valid, i.e.

$$g_p(x,y) = \int_{-\infty}^{\infty} \int_{-\infty}^{\infty} h'(x,y,\alpha,\beta,e_p,z) f(\alpha,\beta) d\alpha d\beta. \quad (24)$$

Also, the parameter $\sigma_p$ is approximately proportional to the blur circle radius $R_p$ given by the relation $\sigma_p = R_p/\sqrt{2}$.

Now, we use the novel Rao Localization Transform to get the localized PSF h as below:

$$h(x,y,\alpha,\beta,e_p,z(x,y)) = h'(x+\alpha, y+\beta, x, y, e_p, z(x,y)). \quad (25)$$

Therefore, the localized SV-PSF is $$h(x, y, \alpha, \beta, e_p, z) = \frac{1}{2\pi\sigma_p^2(x, y, z)} \exp\left(-\frac{\alpha^2 + \beta^2}{2\sigma_p^2(x, y, z)}\right) \quad (26)$$

With this new SV-PSF, we can verify that the relation between the shift-variant blurred image and the focused image given by Equation (6) is correct, i.e.

$$g_p(x,y) = \int_{-\infty}^{\infty} \int_{-\infty}^{\infty} h(x-\alpha, y-\beta, \alpha, \beta, e_p, z) f(x-\alpha, y-\beta) \, d\alpha d\beta. \quad (27)$$

Next we consider the Taylor series expansion of f(x,y) up to second order, i.e. N=2, and the Taylor series expansion of $h(x,y,\alpha,\beta,e_p,z)$ up to first order, i.e. M=1. Other higher order terms are taken to be zeros in this example, but in a general case, M and N can be arbitrarily large.

We will define a new parameter $\rho_p(x,y,z)$ as $$\rho_p(x, y, z) = \frac{1}{\sigma_p^2(x, y, z)}. \quad (28)$$

Therefore the SV-PSF can be written as $$h(x, y, \alpha, \beta, e_p, z) = \frac{\rho_p(x, y, z)}{2\pi} \exp\left(-\frac{\rho_p(x, y, z)(\alpha^2 + \beta^2)}{2}\right) \quad (29)$$

For this case, many moment parameters and their derivatives become zero. Specifically, $$h_p^{(1,0)} = \frac{\partial}{\partial x} h(x, y, \alpha, \beta, e_p, z) \quad (31)$$

$$= \frac{\rho_p^{(1,0)}}{\rho_p} h(x, y, \alpha, \beta, e_p, z)\left(1 - \frac{(\alpha^2 + \beta^2)\rho_p}{2}\right).$$

Similarly $$h_p^{(0,1)} = \frac{\partial}{\partial y} h(x, y, \alpha, \beta, e_p, z) \quad (31)$$

$$= \frac{\rho_p^{(0,1)}}{\rho_p} h(x, y, \alpha, \beta, e_p, z)\left(1 - \frac{(\alpha^2 + \beta^2)\rho_p}{2}\right).$$

We see that $h^{(1,0)}$ and $h^{(0,1)}$ are both rotationally symmetric with respect to $\alpha$ and $\beta$ (but, in general, not with respect to x and y). Therefore, all odd moments with respect to $\alpha$ and $\beta$ are zero, i.e.

$$h_{p,i,j}^{(1,0)} = h_{p,i,j}^{(0,1)} = 0 \text{ if } i \text{ is odd or } j \text{ is odd.} \quad (32)$$

Also, $$h_{p,0,0}^{(0,0)} = \int_{-\infty}^{\infty}\int_{-\infty}^{\infty} h(x,y,\alpha,\beta,e_p,z) d\alpha d\beta = 1 \quad (33)$$

for all (x,y) and therefore, all derivatives of $h_{p,0,0}^{(0,0)}$ with respect to x and y are zero. Also, since M=1, all derivatives of h of order more than 1 with respect to x and y are zero. In summary, $$h_{p,0,0}^{(0,0)} = 1, h_{p,1,0}^{(0,0)} = h_{p,0,1}^{(0,0)} = h_{p,1,1}^{(0,0)} = 0, \quad (34)$$

$$h_{p,1,0}^{(1,0)} = h_{p,1,1}^{(1,0)} = h_{p,2,1}^{(1,0)} = h_{p,1,2}^{(1,0)} = h_{p,3,0}^{(1,0)} = 0, \quad (35)$$

$$h_{p,0,1}^{(0,1)} = h_{p,1,1}^{(0,1)} = h_{p,2,1}^{(0,1)} = h_{p,1,2}^{(0,1)} = h_{p,0,3}^{(0,1)} = 0. \quad (36)$$

Therefore we get RT to be $$g^{(0,0)} = f^{(0,0)} + f^{(1,0)} h_{p,2,0}^{(1,0)} + f^{(0,1)} h_{p,0,2}^{(0,1)} + \frac{1}{2} f^{(2,0)} h_{p,2,0}^{(0,0)} + \quad (37)$$

$$\frac{1}{2} f^{(0,2)} h_{p,0,2}^{(0,0)}$$

The above equation gives a method of computing the output signal g(x,y) given the input signal f(x,y). It can be written in a form similar to Eq. (16) to obtain the RT coefficients $S_{p,n,i}$.

We can derive the inverse RT for this case using Equation (37). We consider the various derivatives of g in Eq. (37) and solve for the derivatives of f as unknowns. In this particular example, we first solve for $f^{(0,0)}$ in terms of other terms using Eq. (37). Then, we take the derivative of the expression for $f^{(0,0)}$ with respect to x and solve for $f^{(0,1)}$. Next we take the derivative of $f^{(0,0)}$ with respect to y and solve for $f^{(0,1)}$. Then we take the derivative with respect to x of $f^{(1,0)}$ and $f^{(0,1)}$ and solve for $f^{(2,0)}$ and $f^{(1,1)}$ respectively. Similarly we take derivatives with respect to y of $f^{(0,1)}$ and $f^{(1,0)}$ and solve for $f^{(0,2)}$ and $f^{(1,1)}$ respectively. Finally, we back substitute these results and eliminate $f^{(1,0)}$, $f^{(0,1)}$, $f^{(2,0)}$, $f^{(2,0)}$, and $f^{(0,2)}$ to get the following explicit solution for $f^{(0,0)}$ in terms of the derivatives of g and moments of the derivatives of h as below $$f^{(0,0)} = g_p^{(0,0)} - g_p^{(1,0)} h_{p,2,0}^{(1,0)} - g_p^{(0,1)} h_{p,0,2}^{(0,1)} + \quad (38)$$

$$g_p^{(2,0)}\left(\frac{3}{2}(h_{p,2,0}^{(1,0)})^2 + \frac{1}{2} h_{p,0,2}^{(0,1)} h_{p,2,0}^{(1,0)} - \frac{1}{2} h_{p,2,0}^{(0,0)}\right) +$$

$$g_p^{(0,2)}\left(\frac{3}{2}(h_{p,0,2}^{(0,1)})^2 + \frac{1}{2} h_{p,2,0}^{(1,0)} h_{p,0,2}^{(0,1)} - \frac{1}{2} h_{p,0,2}^{(0,0)}\right)$$

for $p = 1, 2, 3, \ldots, P$,

Further simplification of the above equation is possible due to rotational symmetry (e.g. $h_{p,2,0}^{(1,0)} = h_{p,0,2}^{(0,1)}$, and $h_{p,2,0}^{(0,0)} = h_{p,0,2}^{(0,0)}$). The above equation gives an explicit, closed-form, formula for restoring an image blurred by a shift-variant Gaussian point spread function. The above equation can be written in a form similar to Equation (22) for inverse RT to obtain the IRT coefficients $S'_{p,n,i}(z)$.

We get a system of equations from Eq. (38) for each value of p. The only unknowns are the focused image $f^{(0,0)} = f(x,y)$, and the shape parameters $z = (z^{(0,0)}, z^{(1,0)}, z^{(0,1)}, z^{(2,0)}, \ldots)$. Solving this system of equations, we determine the focused image and the shape parameters. If multiple solutions are obtained, then physical constraints, or additional images can be processed to determine unique solutions.

EXAMPLE 2

Cylindrical or Pill-Box SV-PSF: Paraxial Geometric Optics

In the preferred embodiment of the present invention, the shape of the camera aperture is circular. Therefore the point spread function has a non-zero constant value inside a circular region and has a zero value outside of the circular region. This circular region is also referred to as "blur circle". The point spread function in this case is circularly symmetric about the center of the blur circle.

In the paraxial geometric optics model of image formation, the non-localized SV-PSF h' is given by a cylindrical function defined by $$h'(x, y, \alpha, \beta, e_p, z(\alpha, \beta)) = \begin{cases} \frac{1}{\pi R_p^2(\alpha, \beta, z(\alpha, \beta))} & \text{for } (x-\alpha)^2 + (y-\beta)^2 \leq R_p^2(\alpha, \beta, z(\alpha, \beta)) \\ 0 & \text{otherwise.} \end{cases} \quad (39)$$

Note that, with this definition, Equation (4) that gives the relation between the shift-variant blurred image and the focused image will be valid, i.e.

$$g_p(x,y) = \int_{-\infty}^{\infty} \int_{-\infty}^{\infty} h'(x,y,\alpha,\beta,e_p,z) f(\alpha,\beta) d\alpha d\beta. \quad (40)$$

Now, we use the Rao Localization Transform to get the localized PSF h as below:

$$h(x,y,\alpha,\beta,e_p,z(x,y)) = h'(x+\alpha,y+\beta,x,y,e_p,z(x,y)). \quad (41)$$

Therefore, the localized SV-PSF is $$h(x, y, \alpha, \beta, e_p, z) = \begin{cases} \frac{1}{\pi R_p^2(x, y, z)} & \text{for } \alpha^2 + \beta^2 \leq R_p^2(x, y, z) \\ 0 & \text{otherwise} \end{cases} \quad (42)$$

With this new SV-PSF, we can verify that the relation between the shift-variant blurred image and the focused image given by Equation (6) is correct, i.e.

$$g_p(x,y) = \int_{-\infty}^{\infty} \int_{-\infty}^{\infty} h(x-\alpha,y-\beta,\alpha,\beta e_p,z) f(x-\alpha,y-\beta) d\alpha d\beta \quad (43)$$

In this case, $R_p(x,y,z)$ is the blur circle radius given by $$R_p(x, y, z) = \frac{D_p s_0}{2} \left( \frac{1}{F_p} - \frac{1}{z(x, y)} - \frac{1}{s_p} \right). \quad (44)$$

In the above equation, $s_0$ corresponds to a standard magnification factor. We will define a new parameter $\rho_p(x,y,z)$ as $$\rho_p(x, y, z) = \frac{1}{R_p^2(x, y, z)}. \quad (45)$$

Therefore the SV-PSF can be written as $$h(x, y, \alpha, \beta, e_p, z) = \begin{cases} \frac{\rho_p(x, y, z)}{\pi} & \text{for } \alpha^2 + \beta^2 \leq \left(1 / \sqrt{\rho_p(x, y, z)}\right) \\ 0 & \text{otherwise} \end{cases} \quad (46)$$

Next we consider the Taylor series expansion of f(x,y) up to second order, i.e. N=2, and the Taylor series expansion of h(x,y,α,β,$e_p$,z) up to first order, i.e. M=1. In this case we obtain $$h_p^{(1,0)} = \frac{\partial}{\partial x} h(x, y, \alpha, \beta, e_p, z) \quad (47)$$

$$h_p^{(1,0)} = \begin{cases} \frac{\rho_p^{(1,0)}(x, y, z)}{\pi} & \text{for } \alpha^2 + \beta^2 \leq \left(1 / \sqrt{\rho_p(x, y, z)}\right) \\ 0 & \text{otherwise} \end{cases}$$

and $$h_p^{(0,1)} = \frac{\partial}{\partial y} h(x, y, \alpha, \beta, e_p, z) \quad (48)$$

$$h_p^{(0,1)} = \begin{cases} \frac{\rho_p^{(0,1)}(x, y, z)}{\pi} & \text{for } \alpha^2 + \beta^2 \leq \left(1 / \sqrt{\rho_p(x, y, z)}\right) \\ 0 & \text{otherwise} \end{cases}$$

Once again, as in the case of the Gaussian, the functions $h, h_p^{(1,0)}$, and $h_p^{(0,1)}$ are all rotationally symmetric with respect α and β (but, in general, not with respect to x and y). Therefore, in this case also, many moment parameters and their derivatives become zero. Specifically, all odd moments with respect to α and β are zero, i.e.

$$h_{p,i,j}^{(1,0)} = h_{p,i,j}^{(0,1)} = 0 \text{ if i is odd or j is odd.} \quad (49)$$

Also, $$h_{p,0,0}^{(0,0)} = \int_{-\infty}^{\infty} \int_{-\infty}^{\infty} h(x,y,\alpha,\beta,e_p,z) d\alpha d\beta = 1 \quad (50)$$

for all (x,y) and therefore, all derivatives of $h_{p,0,0}^{(0,0)}$ with respect to x and y are zero. Also, since M=1, all derivatives of h of order more than 1 with respect to x and y are all zero. In particular, $$h_{p,0,0}^{(0,0)} = 1, h_{p,1,0}^{(0,0)} = h_{p,0,1}^{(0,0)} = h_{p,1,1}^{(0,0)} = 0, \quad (51)$$

$$h_{p,1,0}^{(1,0)} = h_{p,1,1}^{(1,0)} = h_{p,1,2}^{(1,0)} h_{p,3,0}^{(1,0)} = 0, \quad (52)$$

$$h_{p,0,1}^{(0,1)} = h_{p,1,1}^{(0,1)} = h_{p,2,1}^{(0,1)} = h_{p,1,2}^{(0,1)} = h_{p,0,3}^{(0,1)} = 0. \quad (53)$$

Therefore we get RT to be $$g^{(0,0)} = f^{(0,0)} + f^{(1,0)} h_{p,2,0}^{(1,0)} + f^{(0,1)} h_{p,0,2}^{(0,1)} + \frac{1}{2} f^{(2,0)} h_{p,2,0}^{(0,0)} + \frac{1}{2} f^{(0,2)} h_{p,0,2}^{(0,0)} \quad (54)$$

The above equation gives a method of computing the output signal g(x,y) given the input signal f(x,y). It can be written in a form similar to Eq. (16) to obtain the RT coefficients $S_{p,n,i}$.

We can derive the inverse RT for this case using Equation (54). We consider the various derivatives of g in Eq. (54) and solve for the derivatives of f as unknowns. In this particular example, we first solve for $f^{(0,0)}$ in terms of other terms using Eq. (54). Then, we take the derivative of the expression for $f^{(0,0)}$ with respect to x and solve for $f^{(0,1)}$. Next we take the derivative of $f^{(0,0)}$ with respect to y and solve for $f^{(0,1)}$. Then we take the derivative with respect to x of $f^{(1,0)}$ and $f^{(0,1)}$ and solve for $f^{(2,0)}$ and $f^{(1,1)}$ respectively. Similarly we take derivatives with respect to y of $f^{(0,1)}$ and $f^{(1,0)}$ and solve for $f^{(0,2)}$ and $f^{(1,1)}$ respectively. Finally, we back substitute these results and eliminate $f^{(1,0)}, f^{(0,1)}, f^{(2,0)}, f^{(1,1)}$, and $f^{(0,2)}$ to get the following explicit solution for $f^{(0,0)}$ in terms of the derivatives of g and moments of the derivatives of h as below $$f^{(0,0)} = g_p^{(0,0)} - g_p^{(1,0)} h_{p,2,0}^{(1,0)} - g_p^{(0,1)} h_{p,0,2}^{(0,1)} + \qquad (55)$$
$$g_p^{(2,0)}\left(\frac{3}{2}(h_{p,2,0}^{(1,0)})^2 + \frac{1}{2}h_{p,0,2}^{(0,1)}h_{p,2,0}^{(0,1)} - \frac{1}{2}h_{p,2,0}^{(0,0)}\right) \text{ for } p = 1,$$
$$2, 3, \ldots, P, + g_p^{(0,2)}\left(\frac{3}{2}(h_{p,0,2}^{(0,1)})^2 + \frac{1}{2}h_{p,2,0}^{(1,0)}h_{p,0,2}^{(0,1)} - \frac{1}{2}h_{p,0,2}^{(0,0)}\right)$$

Further simplification of the above equation is possible due to rotational symmetry (e.g. $h_{p,2,0}^{(1,0)}$=$h_{p,0,2}^{(0,1)}$, and $h_{p,2,0}^{(0,0)}$= $h_{p,0,2}^{(0,0)}$). The above equation gives an explicit, closed-form, formula for restoring an image blurred by a shift-variant Gaussian point spread function. The above equation can be written in a form similar to Equation (22) for inverse RT to obtain the IRT coefficients $S'_{p,n,i}(z)$.

We get a system of equations from Eq. (55) for each value of p. The only unknowns are the focused image $f^{(0,0)}$ and the shape parameters $z=(z^{(0,0)}, z^{(1,0)}, z^{(0,1)} z^{(2,0)}, \ldots)$. Solving this system of equations, we determine the focused image and the shape parameters. If multiple solutions are obtained, then physical constraints, or additional images can be processed to determine unique solutions.

9. CONCLUSION, RAMIFICATIONS, AND SCOPE OF INVENTION

The present invention was mainly conceived in the context of digital imaging, and machine vision applications. There are also other applications where this invention can be used after minor modifications. It can be extended to any linear shift-variant system and the problem of estimating the system parameters given multiple outputs of the system can be solved.

While the description in this report of the method, apparatus, and applications contains many specificities, these should not be construed as limitations on the scope of the invention, but rather as exemplifications of preferred embodiments thereof. Further modifications and extensions of the present invention herein disclosed will occur to persons skilled in the art to which the present invention pertains, and all such modifications are deemed to be within the scope and spirit of the present invention as defined by the appended claims and their legal equivalents thereof.

What is claimed is:

1. A method of determining a focused image f(x,y) of a scene with respect to a camera, said scene having a 3D shape z(x,y) which is characterized by a shape parameter vector z, and said camera characterized by a set of camera parameters $e_p$, said method comprising:
   (a) recording a set of images $g_p(x,y)$ of said object with different camera parameter settings $e_p$, for p=1,2,3, . . . , P;
   (b) obtaining a set of normalized images by preprocessing said set of images $g_p(x,y)$ to reduce noise by filtering and normalizing them with respect to average brightness and magnification so that said set of normalized images are related to said focused image f(x,y) by a linear integral of the product of said focused image with a non-localized shift-variant point spread function h';
   (c) computing a set of derivatives $g_p^{(m,n)}(x,y)$ of said set of normalized images to obtain a set of image derivatives where m and n are the integer order of derivatives with respect to x and y respectively, for m,n=0,1,2,3, . . . ;
   (d) determining the localized shift-variant point spread function (SV-PSF) h from said non-localized PSF h' using the novel Rao Localization Transform expressed in the form $$h(x,y,\alpha,\beta;e_p,z)=h'(x+\alpha,y+\beta,x,y;e_p,z)$$

where (x,y) specifies the position where image brightness is measured and $(\alpha,\beta)$ specifies the position of surrounding image points which are contributing to light measured at (x,y);
   (e) deriving a set of expressions for the various moments with respect to $\alpha$ and $\beta$ of the derivatives with respect to x and y of the localized SV-PSF $h_{i,j}^{(m,n)}$ in terms of the camera parameters $e_p$ and shape parameter vector z;
   (f) deriving a system of P algebraic equations that express said focused image f(x,y) as a weighted sum of the derivatives of said set of normalized images $g_p^{(m,n)}(x,y)$ in terms of the Inverse Rao Transform (IRT) coefficients that are functions of $h_{i,j}^{(m,n)}$;
   (g) solving said system of P algebraic equations to obtain said focused image f(x,y) at each point (x,y), and providing it as digital image output.

2. The method of claim 1 wherein said non-localized shift-variant point spread function h' is a Gaussian function.

3. The method of claim 1 wherein said non-localized shift-variant point spread function h' is a Cylindrical or pill-box function.

4. The method of claim 1 wherein said non-localized shift-variant point spread function h' is determined by physical or wave optics model of image formation.

5. The method of claim 1, wherein said focused image f(x,y) and 3D shape z(x,y) along with desired camera parameters are provided as input to a virtual camera simulation software and an output image f'(x,y) that would be recorded by a real camera corresponding to said virtual camera is computed and provided as output.

6. The method of claim 1 wherein said output image f(x,y) is computed at regular time intervals for a time-varying scene and the resulting computed output image sequence is synthesized into video data and provided as video output.

7. The method of claim 6 wherein said non-localized shift-variant point spread function h' is a Gaussian function.

8. The method of claim 6 wherein said non-localized shift-variant point spread function h' is a Cylindrical or pill-box function.

9. The method of claim 6 wherein said non-localized shift-variant point spread function h' is determined by physical or wave optics model of image formation.

10. A method of determining a 3D shape z(x,y) of a scene with respect to a camera, said 3D shape z(x,y) characterized by a shape parameter vector z, said scene having a focused image f(x,y), and said camera characterized by a set of camera parameters $e_p$, said method comprising:
   (a) recording a set of images $g_p(x,y)$ of said object with different camera parameter settings $e_p$, for p=1,2,3, . . . , P;
   (b) obtaining a set of normalized images by preprocessing said set of images $g_p(x,y)$ to reduce noise by filtering and normalizing them with respect to average brightness and magnification so that said set of normalized images are related to said focused image f(x,y) by a linear integral of the product of said focused image with a non-localized shift-variant point spread function h';
   (c) computing a set of derivatives $g_p^{(m,n)}(x,y)$ of said set of normalized images to obtain a set of image derivatives where m and n are the integer order of derivatives with respect to x and y respectively, for m,n=0,1,2,3, . . . ;

(d) determining the localized shift-variant point spread function (SV-PSF) h from said non-localized PSF h' using the novel Rao Localization Transform expressed in the form $$h(x,y,\alpha,\beta;e_p,z)=h'(x+\alpha,y+\beta,x,y;e_p,z)$$

where (x,y) specifies the position where image brightness is measured and ($\alpha,\beta$) specifies the position of surrounding image points which are contributing to light measured at (x,y);

(e) deriving a set of expressions for the various moments with respect to $\alpha$ and $\beta$ of the derivatives with respect to x and y of the localized SV-PSF $h_{i,j}^{(m,n)}$ in terms of the camera parameters $e_p$ and shape parameter vector z;

(f) deriving a system of P algebraic equations that express said focused image f(x,y) as a weighted sum of the derivatives of said set of normalized images $g_p^{(m,n)}(x,y)$ in terms of the Inverse Rao Transform (IRT) coefficients that are functions of $h_{i,j}^{(m,n)}$;

(g) solving said system of P algebraic equations to obtain said shape parameter vector z and said 3D shape z(x,y) at each point (x,y), and providing it as digital shape output.

11. The method of claim 10 wherein said non-localized shift-variant point spread function h' is a Gaussian function.

12. The method of claim 10 wherein said non-localized shift-variant point spread function h' is a Cylindrical or pillbox function.

13. The method of claim 10 wherein said non-localized shift-variant point spread function h' is determined by physical or wave optics model of image formation.

14. The method of claim 10 wherein said output shape z(x,y) is computed at regular time intervals for a time-varying scene and the resulting computed output shape sequence is synthesized into time-varying shape data and provided output.

15. The method of claim 14 wherein said non-localized shift-variant point spread function h' is a Gaussian function.

16. The method of claim 14 wherein said non-localized shift-variant point spread function h' is a Cylindrical or pillbox function.

17. The method of claim 14 wherein said non-localized shift-variant point spread function h' is determined by physical or wave optics model of image formation.

18. Apparatus for determining the focused image and 3D shape of an object with respect to a camera, said apparatus comprising a camera characterized by a set of camera parameters, a camera controller for setting said set of camera parameters to desired values, an image detector for capturing images, an image processing computer with software components operatively connected for (i) image normalization for standardizing images with respect to average brightness and magnification, (ii) noise reduction filter, (iii) image derivative computation module, (iv) a unique and essential software component for computing Inverse Rao Transform coefficients, and (v) software for solving algebraic equations to obtain focused image and 3D shape.

19. The apparatus of claim 18 with an additional software component for virtual image camera simulation.

20. The apparatus of claim 18 with and additional software component for virtual video camera simulation.

* * * * *